Nov. 18, 1958 J. R. HEFELE 2,861,124

LINE AMPLIFIER FOR A TELEVISION SYSTEM

Filed June 1, 1953 3 Sheets-Sheet 1

INVENTOR
J. R. HEFELE
BY Hugh S. Wertz
ATTORNEY

LINE AMPLIFIER FOR A TELEVISION SYSTEM

Filed June 1, 1953 3 Sheets-Sheet 2

INVENTOR
J. R. HEFELE
BY Hugh S. Wertz
ATTORNEY

LINE AMPLIFIER FOR A TELEVISION SYSTEM

Filed June 1, 1953 3 Sheets-Sheet 3

INVENTOR
J. R. HEFELE
BY Hugh S. Wertz
ATTORNEY

United States Patent Office 2,861,124

Patented Nov. 18, 1958

2,861,124

LINE AMPLIFIER FOR A TELEVISION SYSTEM

John R. Hefele, Yonkers, N. Y., assignor to Bell Telephone Laboratories, Incorporated, New York, N. Y., a corporation of New York Application June 1, 1953, Serial No. 358,647

5 Claims. (Cl. 178—7.1)

This invention relates to television signal generators and more particularly to line amplifiers for use in television signal generators to amplify picture signals and to combine them with blanking and synchronizing pulses for transmission purposes.

It is an object of this invention to improve the picture quality of a television system.

Some television camera tubes, such as, for example, the Farnsworth dissector and the flying spot scanning tube are so called linear devices, that is, the signal output thereof is at all times proportional to the light intensity of the elemental area being scanned. As most television receiver tubes are non-linear devices, it becomes necessary in order to achieve linear reproduction of scene brightness at the picture tube to include a correcting circuit in the television signal generator system. A suitable correcting circuit is disclosed in copending U. S. application, Serial No. 72,045 of January 21, 1949, of B. M. Oliver, now matured into Patent No. 2,660,614, issued November 24, 1953. In such linear reproduction television systems, it becomes important that each of the circuits therein (with the exception of any correcting circuit, such as that described above) produce signal outputs that are proportional to the signal inputs. This requirement puts a burden on all of the circuits in the generator, but particularly on the line amplifier circuit wherein the picture signal is not only amplified up to ten times its input amplitude, but is also combined with standard television blanking and synchronizing pulses. Due principally to the combining function, the workers in this art in the past have not provided a line amplifier wherein the voltage amplification is uniform over a complete range of signal amplitudes and a wide band of frequencies. This has led to generally poor picture quality at the picture tube.

It is a more specific object of this invention to provide a line amplifier for a television signal generator system having a uniform voltage amplification over a wide band of television signal frequencies and the complete range of signal amplitudes.

A further object of the invention is to provide a line amplifier having a uniform signal amplification and constant time delay over a broad band of television signal frequencies.

In an exemplary embodiment of the invention, there is provided a broad band, line amplifier that includes a television picture signal amplifier, a gate adder to insert large negative voltage gating pulses into the picture signal during the blanking intervals, blanking pulse adder and synchronizing pulse adder circuits for supplying the blanking and synchronizing pulses to the line amplifier, a switching circuit for inserting the blanking and synchronizing pulses into the picture signal during prescribed blanking interval to produce a composite picture signal and an output driver circuit.

A feature of the invention is a switching circuit that is controlled by gating pulses and blanking pulses whereby the combined blanking and synchronizing pulses are transmitted during the prescribed blanking intervals and the picture information signals are transmitted during the remaining intervals.

Another feature of the invention is the use of constant resistance networks in place of bypass condensers in the anode, cathode and grid networks of the tubes in the picture signal channel whereby irregularities in the frequency response band of the amplifier are eliminated.

The invention, its objects and features, will be better understood by considering the following disclosure and drawings forming a part thereof wherein.

Figure 1:
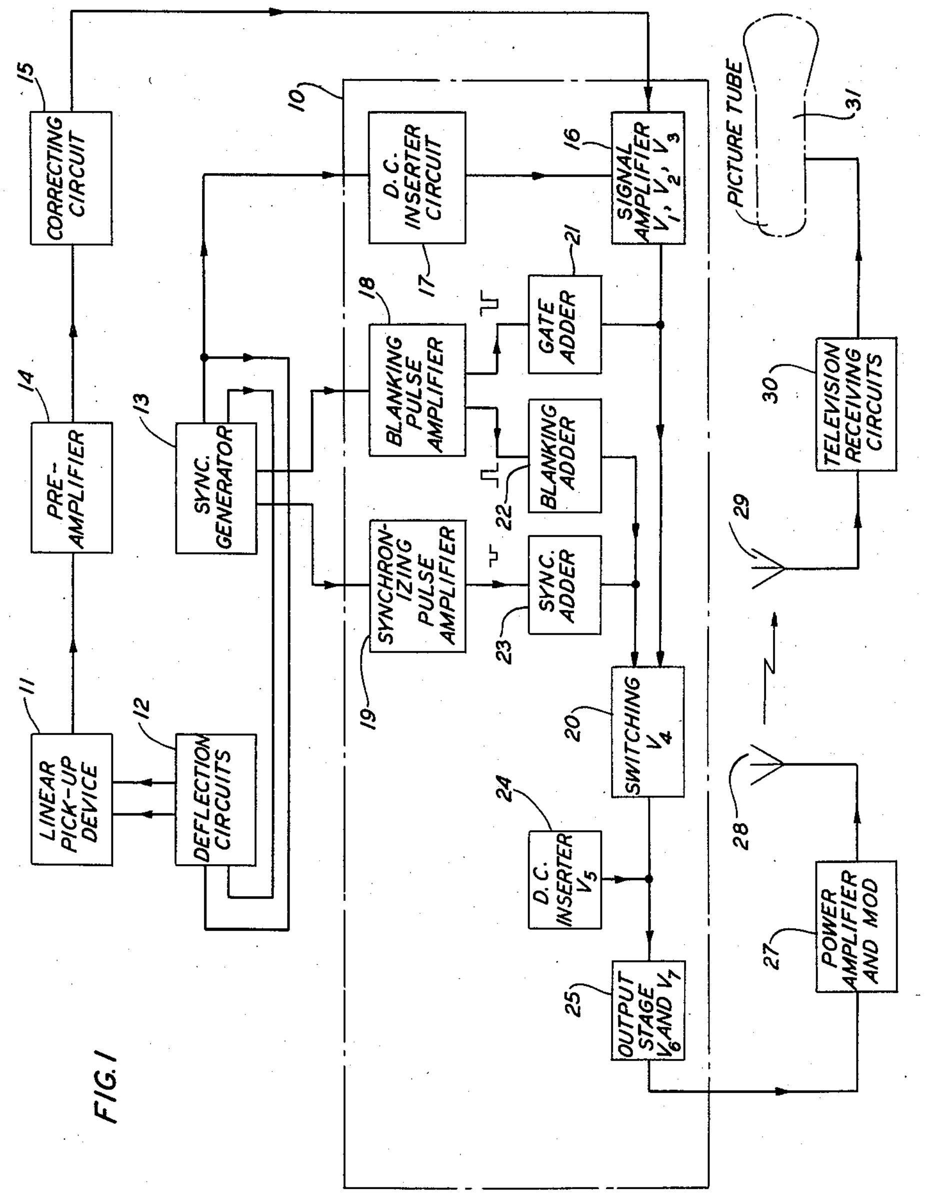
Fig. 1 is a block schematic diagram of a complete television system in which the line amplifier circuit is shown in somewhat greater detail than the rest of the system.

Referring more specifically to the drawings, Fig. 1 shows by way of example, for purposes of illustrating the invention and in block diagram form, a complete television system having linear reproduction characteristics embodying a line amplifier circuit in accordance with the invention. The line amplifier is represented by the elements within the dash-dot rectangle 10. The object to be televised is viewed by any well-known type of linear pick-up device 11. To the device 11 is applied in a well-known manner horizontal and vertical deflecting waves produced by suitable deflecting circuits represented by a box 12. These deflecting waves are synchronized by horizontal and vertical drive pulses delivered to the input of the respective deflection circuits from the synchronizing pulse generator 13. The picture signal from the linear pick-up device 11 which comprises picture information portions and prescribed blanking interval portions is amplified by a preamplifier 14 of any suitable form whose output is then applied to a correcting circuit 15 which may, by way of example, be of the type disclosed in the previously mentioned U. S. patent to B. M. Oliver. The corrected signal is then applied to the line amplifier 10. Specifically, the corrected signal is applied to the picture signal amplifier 16 forming a portion of the circuit 10. Horizontal driving pulses, blanking pulses and synchronizing pulses from the synchronizing pulse generator 13 are applied respectively to the direct-current inserter circuit 17, blanking pulse amplifier and pulse inverter 18 and synchronizing pulse amplifier 19 which form a part of the line amplifier 10. The direct-current inserter circuit 17 causes the grid of tube $V_3$ in the signal voltage amplifier 16 (see Fig. 2) to be connected to ground during a fixed interval. The interval is made to occur during the prescribed blanking interval when the linear pick-up device 11 is scanning a black strip at the left-hand edge of each scanning line (or during an interval when the signal from the pick-up device is at a lever corresponding to a known constant brightness). Consequently, ground potential on the grid of tube $V_3$ is made to correspond to black in the picture and the output current of the amplifier is proportional to the voltage applied to its grid and hence to the brighness of the picture element being scanned. Direct-current inserter circuits are well known in the art and one suitable for use herein is shown in Fig. 3 of the above-mentioned patent to B. M. Oliver.

To provide voltages for combining the synchronizing pulses with the picture signal, voltage pulses of equal amplitude but of opposite polarity are derived from a blanking pulse amplifier and pulse inverter 18 which may be of any suitable type. The pulse of negative polarity is applied to a gate adder circuit 21 which adds a gating pulse to the amplified signal from circuit 16 during the prescribed blanking interval portion thereof. This modified picture signal is carried to a switching circuit 20. The other pulse from the blankng pulse amplifier 18 is applied to a blanking adder circuit 22 to produce in its output a positive pulse. To this pulse is added a negative synchronizing pulse from the synchronizing adder circuit 23 which is driven by the synchronizing pulse amplifier 19. The combined blanking and synchronizing pulses are also applied to the switching circuit 20. In the switching circuit the combined blanking and synchronizing pulses are transmitted during the prescribed blanking interval portions of the picture signal and the picture information portions are transmitted during the remaining intervals to form a composite picture signal in the output. The composite picture signal is then acted upon by a direct-current inserter 24 and passes to the output stage circuit 25. The signal from the output circuit 25 is passed to a modulator and power amplifier 27 where it is modulated by the assigned frequency amplified to the required power, and applied to the transmitting antenna 28. The receiving antennna 29 intercepts a part of the signal radiated from antenna 28 and applies it to a television receiver circuit 30 of any suitable form where it is detected, amplified and finally applied as a picture signal to a grid on picture tube 31 of any suitable type. In a complete television system such as that outlined above, which is essentially a linear reproduction system, the screen brightness on viewing tube 31 is made to be directly and accurately proportional to the elemental scene area scanned by the pick-up tube due to the fact that the corrected signal is linearly amplified and transmitted by the line amplifier in accordance with the invention.

Figure 4A:
Figs. 4A, 4B, 4C, 4D and 4E show in digarammatic form the voltage shapes of the signals appearing at different stages in the line amplifier of the invention.

The operation of the line amplifier circuit 10 will now be considered in greater detail. The picture signal to the line amplifier from the correcting circuit 15 comprises, as shown in Fig. 4A, a picture information portion representing the interval during which the pick-up beam scans one line on the target and a prescribed blanking interval portion representing the remainder of the line scanning time. The portion of the line amplifier 10 to which primary attention shall be given is shown in circuit schematic in Fig. 2. The circuit shown comprises the signal amplifier circuit 16 which includes tubes $V_1$, $V_2$ and $V_3$, the switching circuit 20 which includes tube $V_4$, the direct-current inserter 24 which includes tube $V_5$ and the output stage 25 which includes tubes $V_6$ and $V_7$. The input signal as shown in Fig. 4A is applied across a load resistor 32 which terminates a video input cable 33. The applied signal is of standard polarity, that is, "black negative." The signal across the resistor 32 is applied through the coupling capacitor 34 to the control grid of tube $V_1$, a grid resistor 35 also being connected in the input circuit of the tube. The cathode bias is provided by potentiometer 36 which has connected to the variable tap thereof a constant resistance network to control the amount of local feedback in the amplifier tube and the gain thereof. The constant resistance network comprises a series connected resistor 38 and a condenser 39 in parallel with a bypass condenser 37. The anode of the tube is connected to a positive terminal of a constant potential source 40, terminal A through a load network comprising resistor 41, inductance 42 and resistor 43. Condenser 44, which is an element of the load network, is connected between ground potential and the junction of resistor 41 and inductance 42. A constant resistance network comprising condenser 45, resistor 46 and condenser 47 is connected to the other terminal of inductance 42 and to ground potential. The load network and constant resistance network are used in the anode circuit arrangement to provide constant signal amplification and time delay over a wide band of frequencies. The screen grid of $V_1$ is connected to the source 40 through a resistor 48 and to the ground through a bypass condenser 49. The output of tube $V_1$ is taken from the anode thereof and applied directly to the control grid of cathode follower $V_2$ which acts to separate the output capacitance of tube $V_1$ from the input capacitance of tube $V_3$ and makes it possible to maintain a high load impedance over a broad frequency band. The anode and screen grid of tube $V_2$ is connected to the source 40 through resistors 50 and 51. Resistors 50 and 51 are connected at their junction to ground potential through a constant resistance net work comprising condenser 52 joined in parallel with resistor 53 and condenser 54. The cathode of tube $V_2$ is connected to ground through a cathode load resistor 55 and supplies the input to tube $V_3$ through a series peaking coil 56 and coupling condenser 57. At the tube $V_3$ grid resistor 58 is connected from the control grid to ground and a current feedback resistor 59 connects the cathode of tube $V_3$ also to ground. The anode of tube $V_3$, from which the amplified picture signal is taken, is connected to the source 40, terminal B, through resistor 60, inductance 61 and resistor 62. Condenser 63 is connected to the junction of inductance 61 and resistor 60 and a constant resistance network comprising parallel condenser 64 and resistor 65 and condenser 66 are connected to the other terminal of the inductance and to ground potential. The screen grid of tube $V_3$ is connected through resistor 67 and 62 to the source 40, terminal B. A direct-current inserter circuit that acts to hold the signal voltage to the black level reference, as referred to previously, is connected to the control grid of tube $V_3$ through a terminal 68.

Figure 4B:
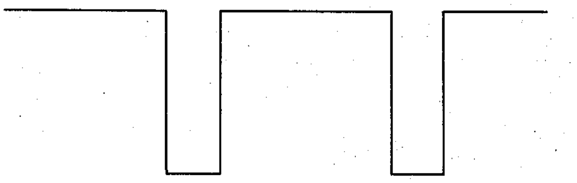
Figure 4C:
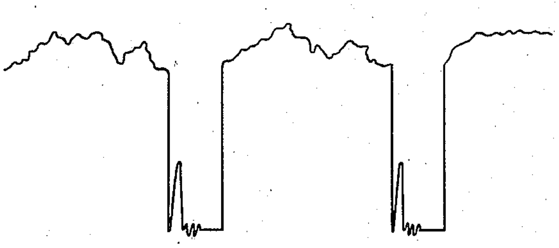

The output from the signal amplifier as taken from the anode of tube $V_3$ represents the amplified picture signal with the direct-current component reinserted. By means of a terminal 69, connected to the anode of tube $V_3$, a large negative voltage gating pulse shown in Fig. 4B is added to the amplified picture signal during the prescribed blanking interval portion thereof, thereby modifying the picture signal to that shown in Fig. 4C. This modified signal is applied to grid 70 of the twin triode tube $V_4$. The gating pulse is applied to terminal 69 from the gate pulse adding circuit 21 of Fig. 1. The adding circuit may be of a conventional type such as, for example, an amplifier tube which is normally cut off and is made to conduct saturated current during the gating pulse interval whereby a large negative voltage is produced.

The twin triode tube $V_4$ and its associated circuit elements comprise the switching circuit wherein blanking and synchronizing pulses are combined with the amplified and modified television signal voltage. The anodes of the tube $V_4$ are connected through a resistor 71 through resistances 72 and 73, respectively, to a source of constant potential 74. A constant resistance network comprising condenser 75 connected in parallel with condenser 76 and resistor 77 is connected between the junction of resistors 71 and 72 and 73 and ground potential. The cathode of tube $V_4$ is connected to ground potential through the cathode load resistor 78.

Figure 4D:
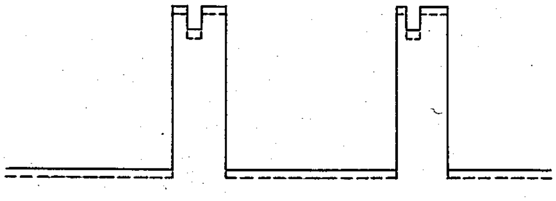
Figure 4E:
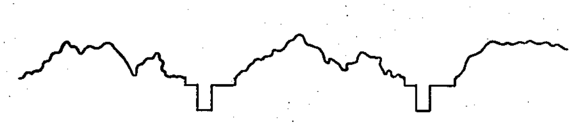

The blanking pulse which has an occurrence simultaneous with and a polarity opposite to the gating pulse is applied to the other grid 79 of the twin triode $V_4$ at a terminal 80. The synchronizing pulse is likewise applied to the grid 79 at a terminal 81. The combined pulses are of a form as shown in Fig. 4D. The voltage level of the combined pulses may be shifted as shown by the dotted lines in Fig. 4D through variable resistor 97 connected between ground and grid 79. The source of the blanking pulse is the blanking adder circuit 22 shown in Fig. 1 and the source of the synchronizing pulse is the synchronizing adder circuit 23 of Fig. 1. Both the blanking and synchronizing adder circuits are of type similar to the gate adder circuit 21. During the picture signal interval the first section of tube $V_4$ of which grid 70 is a part is conducting and the second section of the tube of which grid 79 is a part is held beyond cutoff. During this interval an amplified picture signal voltage is present across the load resistor 78. However, during the prescribed blanking interval the first section of tube $V_4$ is driven beyond cutoff by the large negative gating pulse and the second section of tube $V_4$ is made conducting at the same instant by the large positive blanking pulse. During this interval the blanking pulse and the added synchronizing pulse appear in the output load resistor 78. The signal voltage across the resistor 78 appears then as the signal shown in Fig. 4E.

The output signal is now applied to the grids of twin triode tubes $V_6$ and $V_7$, operating as output stage amplifiers, through the peaking coil 82 and coupling capacitor 83. The picture signal voltage applied to the grids $V_6$ and $V_7$ is clamped to ground potential by a double diode tube $V_5$ or any other clamping means. A resistor 84 is connected between the grids and ground potential. The anodes of the tubes $V_6$ and $V_7$ are each connected to the positive terminal of source 90 through the individual resistors 85, 86, 87 and 88 and a common resistor 89. The junction of the resistors 85, 86, 87 and 88 and 89 is connected to ground potential through a constant resistance network comprising a condenser 91 in parallel with resistor 92 and condenser 93. The cathodes of tubes $V_6$ and $V_7$ are connected to ground potential through a cathode load resistor 94 and the composite picture signal output, across the load resistor, is applied to the video signal cable 95 through a resistor 96 which has been inserted in series to match the impedance of the video cable.

Figure 3A:
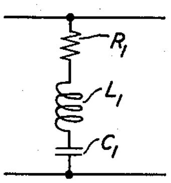
Figs. 3A and 3B are respectively an equivalent circuit diagram of a bypass capacitor commonly used in line amplifiers and an equivalent circuit diagram of the constant resistance networks used in the line amplifier of this invention.

In the picture signal channel circuits of the line amplifier constant resistance networks are inserted in place of simple bypass capacitors to eliminate antiresonant peaks in the frequency transmission band. The equivalent electrical network of the large bypass capacitors commonly used in line amplifiers is shown in Fig. 3A. This equivalent network has been transformed into a constant resistance network by the addition of resistor $R_2$ and capacitor $C_2$. Constant resistance networks are described in Radio Engineer's Handbook," by F. E. Terman, McGraw-Hill Book Company, 1943, page 250. At low frequencies substantially all the current flow is through the $R_1C_1L_1$ branch of the network having an impedance $Z_1$ wherein $C_1$ is the capacitance of an electrolytic capacitor and $R_1$ and $L_1$ are respectively the resistance and inductance associated with the capacitor circuit connections. At high frequencies most of the current flow is through the parallel branch including $R_2$ and $C_2$ having an impedance $Z_2$. $R_2$ and $C_2$ are respectively a small resistance and a small capacitance chosen so that $R_1=R_2$ and $Z_1Z_2=R_1^2$. The function of such constant resistance networks in the amplifier circuit is to maintain efficient bypass characteristics of the capacitors through and beyond the range where the capacitors themselves become antiresonant thereby eliminating antiresonant peaks in the picture signal channel.

Figure 2:
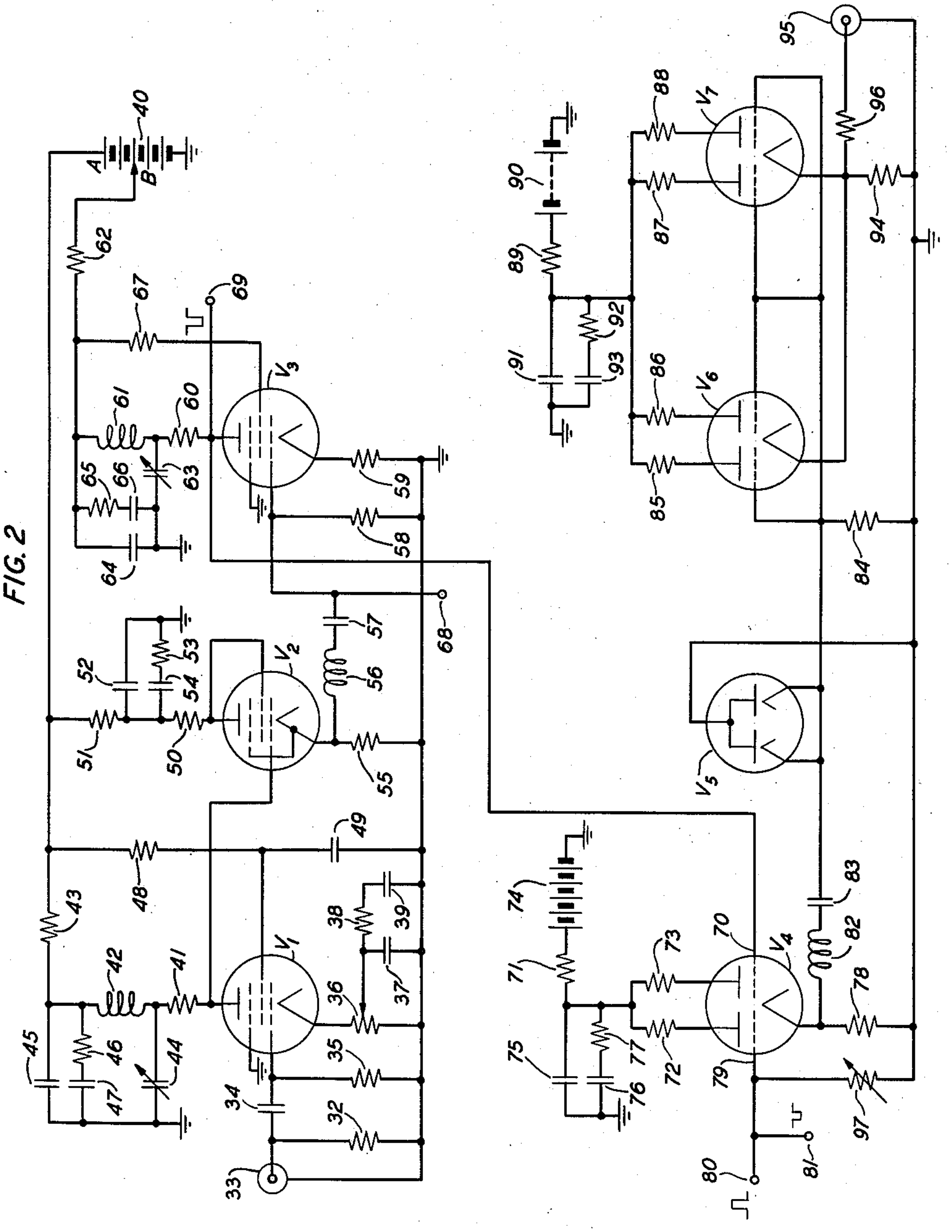
Fig. 2 is a schematic diagram of a portion of the line amplifier circuitry of the invention.
Figure 3B:
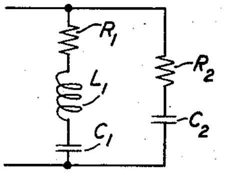

Throughout the line amplifier circuit of Fig. 2 the tubes in the picture signal channel are operated over the linear portion of their grid voltage-plate current characteristic curves at all voltage amplitudes of the picture information signal to achieve uniform signal amplification.

The direct-current component of the composite picture signal inserted by tube $V_5$ clamps the grids of the tubes in the output stage at a chosen low plate current point on their characteristic so that the composite picture signal voltages extend over a linear portion of their range. This arrangement reduces the requirement on tube linearity range making possible the use of small tubes having low power consumption characteristics. While there are a number of possible values that may be used, values for the circuit elements used in an operable embodiment of the invention having a uniform voltage amplification over a 15 megacycle band and a zero departure from signal time delay over a band of more than 10 megacycles are:

| | | |
|---|---|---|
| $V_1$ | | 6AC7 |
| $V_2$ | | 6AK5 |
| $V_3$ | | 6AC7 |
| $V_4$ | | 6J6 |
| $V_5$ | | 6AL5 |
| $V_6$ | | 6J6 |
| $V_7$ | | 6J6 |
| 32 | ohms | 75 |
| 34 | microfarads | .03 |
| 35 | megohms | 9.1 |
| 36 | ohms | 160 |
| 37 | microfarads | 3000 |
| 38 | ohms | 10 |
| 39 | microfarads | .01 |
| 40±A | volts | +300 |
| 40±B | volts | +150 |
| 41 | ohms | 1200 |
| 42 | microhenries | 4.95 |
| 43 | ohms | 15,000 |
| 44 | micromicrofarads | 1.5–7 |
| 45 | microfarads | 20 |
| 46 | ohms | 10 |
| 47 | microfarads | .1 |
| 48 | ohms | 56,000 |
| 49 | microfarads | 20 |
| 50 | ohms | 39 |
| 51 | do | 100 |
| 52 | microfarads | 125 |
| 53 | ohms | 10 |
| 54 | microfarads | .01 |
| 55 | ohms | 15,000 |
| 56 | microhenries | 0.9 |
| 57 | micromicrofarads | 1000 |
| 58 | megohms | 8.2 |
| 59 | ohms | 160 |
| 60 | do | 680 |
| 61 | microhenries | 3.6 |
| 62 | ohms | 12 |
| 63 | micromicrofarads | 1.5–7 |
| 64 | microfarads | 125 |
| 65 | ohms | 10 |
| 66 | microfarads | 0.1 |
| 67 | ohms | 39 |
| 71 | do | 100 |
| 72 | do | 39 |
| 73 | do | 39 |
| 74 | volts | 300 |
| 75 | microfarads | 125 |
| 76 | do | 0.01 |
| 77 | ohms | 10 |
| 78 | do | 15,000 |
| 82 | microhenries | 1.0 |
| 83 | microfarads | 0.1 |
| 84 | megohms | 9.1 |
| 85 | ohms | 39 |
| 86 | do | 39 |
| 87 | do | 39 |
| 88 | do | 39 |
| 89 | do | 10 |
| 90 | volts | 150 |
| 91 | microfarads | 250 |
| 92 | ohms | 10 |
| 93 | microfarads | 0.1 |
| 94 | ohms | 1200 |
| 96 | do | 24 |
| 97 | do | 18,200 |

It is understood that the above-described arrangement is illustrative of the application of the principles of the invention. Numerous other arrangements might be devised by those skilled in the art without departing from the spirit and scope of the invention.

What is claimed is:

1. In a line amplifier for a television system, means for combining blanking and synchronizing signals with a television picture signal having picture information portions and prescribed blanking interval portions, said means comprising a first electron discharge device including an anode, a cathode and a grid, a second electron discharge device including an anode, a cathode and a grid, a constant potential source having a negative terminal and a positive terminal, means including a load resistor for connecting the cathodes of said devices to said negative terminal, means for connecting the anode of said first device to said positive terminal, means for connecting the anode of said second device to said positive terminal, a source of blanking signals and gating signals, said gating signals and blanking signals being of equal magnitude, simultaneous occurrence and opposite polarity, a source of synchronizing signals, means for adding said synchronizing signals to said blanking signals, means for adding said gating signals to said picture signal during said prescribed blanking intervals, and means for applying the picture signals including said gating signals to the grid of said first device and the added blanking and synchronizing signals to the grid of said second device whereby a composite picture signal voltage is generated across said load resistor, said composite picture signal voltage including said picture information portion of said picture signal and said blanking and synchronizing signals.

2. A switching circuit for use in a television signal generator adapted to combine blanking and synchronizing signals with television picture signals having picture information portions and prescribed blanking interval portions comprising a first electron discharge device and a second electron discharge device, each said device including an anode and a grid and said devices having a common cathode, a constant potential source having a negative terminal and a positive terminal, means including a load resistor for connecting the common cathode of a said device to said negative terminal, a first anode resistor connected to said first device, a second anode resistor connected to said second device, means including a third anode resistor for connecting said first and second anode resistors to the positive terminal of said source, a constant resistance network connected between the junction of said third anode resistor and said first and second anode resistors and the negative terminal of said source, a source of blanking signals and of gating signals, said gating signals and blanking signals being of equal magnitude, simultaneous occurrence and opposite polarity, a source of synchronizing signals, means for adding said synchronizing signals to said blanking signals, means for adding said gating signals to said television picture signal during said prescribed blanking interval portions, means for applying the added picture signals and gating signals to the grid of said first device, and means for applying the added blanking and synchronizing signals to the grid of said second device whereby a composite picture signal voltage is generated across said cathode load resistor, said composite picture signal comprising said picture information portions of said television picture signal and said blanking and synchronizing signals, means for controlling the magnitude of said blanking signal comprising a biasing resistor connected between the grid of said second device and the negative terminal of said source, and means to utilize said composite picture signal voltage.

3. A switching circuit according to claim 2, wherein said constant resistance network comprises a first condenser in parallel with a second condenser and a series connected resistor.

4. A circuit for a television system adapted to uniformly amplify broad band television picture signals and to make the signal time delay therein constant comprising a first amplification network, a second amplification network, coupling means and a constant potential source having a first positive terminal, a second positive terminal and a negative terminal, said first amplification network comprising a first electron discharge device including an anode, a cathode and a control grid, means including a first constant resistance network for connecting the cathode of said device to said negative terminal, means including a first load network for connecting the anode of said first device to said first positive terminal, bypass means including a second constant resistance network connected between said negative terminal and the junction of said first load network and positive terminal, and means for applying said television picture signal to the control grid of said first device whereby the amplified television signal appears at the anode of said device, said second amplification network comprising a second electron discharge device including an anode, a cathode and a control grid, means including a resistor for connecting the cathode of said second electron discharge device to said negative terminal, means including a second load network for connecting the anode of said second device to said second positive terminal, and bypass means including a third constant resistance network connected between said negative terminal and the junction of said second load network and positive terminal, said coupling means including a third electron discharge device for connecting the anode of said first device to the control grid of said second device whereby a uniformly amplified television signal having a constant time delay appears at the anode of said second device and means for utilizing said signal.

5. A circuit for a television system according to claim 4 wherein said constant resistance networks comprise a first capacitor in parallel with a series connected resistor and a second capacitor.

References Cited in the file of this patent

UNITED STATES PATENTS

| | | |
|---|---|---|
| 2,239,489 | Hogan | Apr. 22, 1941 |
| 2,535,711 | Wiggin | Dec. 26, 1950 |
| 2,568,541 | Duke | Sept. 18, 1951 |
| 2,660,615 | Ellis et al. | Nov. 24, 1953 |

FOREIGN PATENTS

| | | |
|---|---|---|
| 489,715 | Great Britain | Aug. 2, 1938 |
| 523,862 | Great Britain | July 24, 1940 |